(12) United States Patent
Lemaire et al.

(10) Patent No.: US 11,628,603 B2
(45) Date of Patent: Apr. 18, 2023

(54) SOUND PROTECTION PANEL FOR CLADDING A WALL OF AN AUTOMOTIVE VEHICLE

(71) Applicant: TREVES PRODUCTS, SERVICES & INNOVATION, Paris (FR)

(72) Inventors: Dominique Lemaire, Villiers devant le Thour (FR); Guillaume Crignon, Sillery (FR); Christophe Capron, Epoye (FR); Jean-Christophe Stein, Bouy (FR)

(73) Assignee: TREVES PRODUCTS, SERVICES & INNOVATION, Paris (FR)

( * ) Notice: Subject to any disclaimer, the term of this patent is extended or adjusted under 35 U.S.C. 154(b) by 629 days.

(21) Appl. No.: 16/314,020

(22) PCT Filed: Mar. 9, 2017

(86) PCT No.: PCT/FR2017/050536
§ 371 (c)(1),
(2) Date: Dec. 28, 2018

(87) PCT Pub. No.: WO2018/002457
PCT Pub. Date: Jan. 4, 2018

(65) Prior Publication Data
US 2020/0001804 A1    Jan. 2, 2020

(30) Foreign Application Priority Data
Jul. 1, 2016    (WO) ................. PCT/FR2016/051674

(51) Int. Cl.
*B60R 13/08* (2006.01)
*B29C 43/20* (2006.01)
(Continued)

(52) U.S. Cl.
CPC ........ *B29C 43/203* (2013.01); *B29B 17/0042* (2013.01); *B29C 43/003* (2013.01);
(Continued)

(58) Field of Classification Search
CPC ........................... B60R 13/08; B60R 13/0815
See application file for complete search history.

(56) References Cited

U.S. PATENT DOCUMENTS

| 6,576,172 B1 * | 6/2003 | Ario | ................... B29B 17/0042 264/40.3 |
| 11,052,580 B2 * | 7/2021 | Lemaire | ............... G10K 11/168 |

(Continued)

FOREIGN PATENT DOCUMENTS

| DE | 102006005369 B3 | 7/2007 |
| EP | 1847383 A1 | 10/2007 |

(Continued)

OTHER PUBLICATIONS

English language translation of JP H08-282402 A, generated on Jul. 27, 2021 with Espacenet website https://www.epo.org/searching-for-patents/technical/espacenet.html.*

(Continued)

*Primary Examiner* — Mark Ruthkosky
*Assistant Examiner* — Julia L Rummel
(74) *Attorney, Agent, or Firm* — Murtha Cullina LLP (57) ABSTRACT

The invention relates to a sound protection panel for cladding a wall of an automotive vehicle, the panel includes a mass-spring system. The panel has a lower spring layer based on a resiliently compressible material, an upper mass layer based on resiliently compressible foam flakes, the flakes being bound together by a two-component fibre-based bonding agent comprising a core. The core is fusible at a (Continued)

high temperature or infusible, and a sheath fusible at a lower temperature, the flakes being fused with the sheath to form an upper agglomerated layer.

8 Claims, 4 Drawing Sheets (51) Int. Cl.
    B32B 5/18       (2006.01)
    B32B 5/02       (2006.01)
    B32B 27/08      (2006.01)
    B32B 27/12      (2006.01)
    B32B 5/24       (2006.01)
    B32B 5/22       (2006.01)
    B29B 17/00      (2006.01)
    B29C 44/08      (2006.01)
    B29C 44/12      (2006.01)
    B32B 27/06      (2006.01)
    B32B 7/04       (2019.01)
    D04H 1/542      (2012.01)
    D04H 13/00      (2006.01)
    B29C 51/14      (2006.01)
    G10K 11/168     (2006.01)
    B29C 43/00      (2006.01)
    B32B 5/16       (2006.01)
    B32B 27/14      (2006.01)
    B32B 27/36      (2006.01)
    B32B 27/40      (2006.01)
    B62D 65/14      (2006.01)
    B29K 105/04     (2006.01)
    B29K 105/26     (2006.01)
    B29K 105/12     (2006.01)
    B29L 31/30      (2006.01)
    B29K 75/00      (2006.01)
    B29K 105/00     (2006.01)

(52) U.S. Cl.
    CPC .......... *B29C 44/08* (2013.01); *B29C 44/1209* (2013.01); *B29C 51/14* (2013.01); *B32B 5/022* (2013.01); *B32B 5/16* (2013.01); *B32B 5/18* (2013.01); *B32B 5/22* (2013.01); *B32B 5/245* (2013.01); *B32B 7/04* (2013.01); *B32B 27/065* (2013.01); *B32B 27/08* (2013.01); *B32B 27/12* (2013.01); *B32B 27/14* (2013.01); *B32B 27/36* (2013.01); *B32B 27/40* (2013.01); *B60R 13/08* (2013.01); *B60R 13/0815* (2013.01); *B62D 65/14* (2013.01); *D04H 1/542* (2013.01); *D04H 13/00* (2013.01); *G10K 11/168* (2013.01); *B29K 2075/00* (2013.01); *B29K 2105/04* (2013.01); *B29K 2105/12* (2013.01); *B29K 2105/251* (2013.01); *B29K 2105/26* (2013.01); *B29K 2995/0002* (2013.01); *B29K 2995/0063* (2013.01); *B29L 2031/3005* (2013.01); *B29L 2031/3041* (2013.01); *B32B 2250/03* (2013.01); *B32B 2250/04* (2013.01); *B32B 2250/24* (2013.01); *B32B 2250/40* (2013.01); *B32B 2255/02* (2013.01); *B32B 2255/10* (2013.01); *B32B 2255/102* (2013.01); *B32B 2262/0276* (2013.01); *B32B 2262/12* (2013.01); *B32B 2264/10* (2013.01); *B32B 2264/104* (2013.01); *B32B 2266/0278* (2013.01); *B32B 2272/00* (2013.01); *B32B 2274/00* (2013.01); *B32B 2305/70* (2013.01); *B32B 2307/102* (2013.01); *B32B 2307/51* (2013.01); *B32B 2307/718* (2013.01); *B32B 2307/72* (2013.01); *B32B 2307/7265* (2013.01); *B32B 2307/732* (2013.01); *B32B 2307/734* (2013.01); *B32B 2307/738* (2013.01); *B32B 2471/02* (2013.01); *B32B 2605/00* (2013.01); *B32B 2605/003* (2013.01)

(56) References Cited

U.S. PATENT DOCUMENTS

| | | | |
|---|---|---|---|
| 2010/0108437 A1* | 5/2010 | Bayle | B60R 13/0846 181/286 |
| 2013/0009087 A1 | 1/2013 | Koo et al. | |
| 2017/0129204 A1* | 5/2017 | Mori | B60R 13/08 |

FOREIGN PATENT DOCUMENTS

| | | |
|---|---|---|
| EP | 2053593 A2 | 4/2009 |
| EP | 2502788 A1 | 9/2012 |
| EP | 2549474 A1 | 1/2013 |
| JP | H08282402 A | 10/1996 |

OTHER PUBLICATIONS

English language translation of EP 2549474 A1, generated on Jul. 27, 21 with Espacenet website https://www.epo.org/searching-for-patents/technical/espacenet.html.*

International Search Report issued in corresponding application No. PCT/FR2017/050536 dated Jun. 30, 2017.

* cited by examiner

SOUND PROTECTION PANEL FOR CLADDING A WALL OF AN AUTOMOTIVE VEHICLE

CROSS-REFERENCE TO RELATED APPLICATION

This application claims the benefit of International application number PCT/FR2017/050536, filed Mar. 9, 2017 and International application number PCT/FR2016/051674, filed Jul. 1, 2016 the entire contents of which are incorporated herein by reference.

TECHNICAL FIELD

The invention relates to a sound protection panel for cladding a wall of an automotive vehicle and methods for producing such a panel.

BACKGROUND

A method is known, in particular from document EP2549474, for producing a sound protection panel for cladding a wall of an automotive vehicle, said panel comprising, in particular to form a spring mass system:
- a lower spring layer made from a resiliently compressible material, said layer being designed to be turned towards said wall,
- an upper mass layer made from resiliently compressible foam flakes, said flakes being joined together by a bonding agent.

In an advantageous manner, a spring mass system requires the presence of a sealing layer between the upper and lower layers.

Such a system makes it possible to obtain sound insulation which is all the more great as the upper layer presents a high mass per unit area.

Furthermore, due to its porous nature, the upper layer makes it possible to also obtain sound protection by means of absorption, which gives the panel increased sound protection properties.

It is known in particular to use a bonding agent in the form of a resin which is introduced in liquid form and then solidified, said resin being made for example from polyurethane.

However, the use of this type of bonding agent has various disadvantages which are explained in the following.

In the case of an upper layer used in a panel, for which the absorption function is prioritised relative to the insulation function, the aim is to minimise the weight of said layer in order to lighten said panel.

To achieve this, it would be possible to reduce to iso-thickness the density of the upper layer, so as to reduce its mass per unit area.

However, with such a process, the resistance of the upper layer to the passage of air worsens, so that said layer no longer has the expected sound absorption properties.

SUMMARY OF THE INVENTION

One aim of the invention is therefore to propose a panel which has a light upper layer which is still able to preserve its resistance to the passage of air, and therefore also its sound absorption properties.

In the case of an upper layer used in a panel in which the insulation and absorption functions are of equal importance, it is known from document EP2549474 to give said layer the expected mass per unit area by adding a dispersion of heavy particles into the flakes, said particles being for example made from a thermoplastic elastomer, in particular ethylene propylene diene monomer, charged with a mineral charge.

The aforementioned addition of heavy particles makes it possible to achieve the expected mass per unit area without having to resort to using a surcharge of flakes, which would have the effect of substantially increasing the thickness of the upper layer, which may be incompatible with the space available in the vehicle.

Regarding the absorption properties of the panel, the latter are a function of the resistance of the upper layer to the passage of air, good absorption being achieved by a relevant selection of said resistance.

In order to reduce the cost of such a panel without modifying the mass of the upper layer, and so as to preserve its insulation properties, it may be possible to maximise the percentage by mass of heavy particles in said layer, said particles usually being inexpensive, and to thus minimise the percentage by mass of foam flakes which are more costly.

However, this cost reduction needs to be achieved without modifying the resistance to the passage of air of the upper layer, so as not to worsen the sound absorption properties of the panel.

It is known that the ratio of intrinsic density between the heavy particles and the foam flakes is usually very high, the ratio [intrinsic density of the particles/intrinsic density of the flakes] being for example in the order of 50.

It should be noted here that, throughout the description, the term intrinsic density refers to the density of an individual flake or an individual particle, and not the apparent density of a cluster of flakes or particles.

By taking as an example the value of the ratio hereinabove, it means that the addition of a volume of heavy particles has to be compensated by removing fifty volumes of foam flakes to preserve the mass of the upper layer.

However, it should be noted that the resistance to the passage of the air of the upper layer is essentiality connected to the relative volume of the flakes relative to the volume of the said upper layer, the relative volume of dense particles only marginally affecting this parameter.

Thus, for the iso-mass per unit area, the minimum additional dosage of heavy particles leads to by a drastic reduction of the relative volume of flakes, which involves a significant reduction of the resistance to the passage of air of the upper layer, resulting in a worsening of the absorption properties.

Eventually, such a process does not make it possible to reduce the costs while preserving the resistance to the passage of air of the upper layer, and therefore the sound absorption properties of the panel.

Another aim of the invention is therefore to propose a low cost panel, while preserving the mass per unit area and the resistance to the passage of air of the upper layer.

For this purpose, according to a first aspect, the invention proposes a sound protection panel for cladding a wall of an automotive vehicle, said panel comprising, in particular to form a spring mass system:
- a lower spring layer made from a resiliently compressible material, said layer being designed to be turned towards said wall,
- an upper mass layer made from resiliently compressible foam flakes, said layer being provided with a bonding agent of said flakes which made from bi-component fibres comprising a core, said core being fusible at a high temperature or non-fusible, and a sheath which is fusible at a lower temperature, said flakes being bonded by the fusion of said sheath so as to form an agglomerated upper layer.

It is specified here that, to achieve the fusion of the sheath, it is set above its fusion temperature and below the possible fusion temperature of the core, the latter remaining intact and enabling the agglomerated layer to be provided with a network of fibres.

The benefit of using bonding agent made from bi-component fibres is that, compared with what is observed with a resin that is introduced in a liquid form and then solidified, all of the parameters of the composition being otherwise the same, the upper layer has an increased resistance to the passage of air.

Indeed, the applicant has observed that the bi-component fibres create webs embedded in the upper layer.

According to the applicant, the webs would interfere with the passage of air, which would lead to an increase in the observed resistance to the passage of air.

Thus, it is permissible to reduce the mass per unit area of the upper layer by using bi-component fibres instead of a traditional bonding agent, while still preserving the resistance to the passage of air of the upper layer.

In the case of an agglomerated upper layer containing dispersed heavy particles, the interest in using a bi-component fibre based bonding agent is always that, as explained above, the resistance to the passage of the air of the upper layer is increased while using such fibres by replacing traditional bonding agents.

On this basis, with a view to not modifying the resistance to the passage of the air of the upper layer following the substitution of the resin by the bi-component fibres, it is necessary to reduce the density of said layer so that it is less of an obstacle to the passage of air, leading to a reduction of its mass per unit area.

However, this results in a worsening of the insulating properties of the panel.

Knowing that, as shown above, the relative volume of heavy particles only insignificantly affects the resistance to the passage of air of the upper layer, it is possible to enrich the composition of the upper layer with said particles to recover the desired mass per unit area so that the panel has an effective sound insulation.

According to another aspect, the invention proposes methods for producing such a panel.

BRIEF DESCRIPTION OF THE DRAWINGS

Other features and advantages of the invention are given in the following description, made with reference to the attached figures, in which.

DETAILED DESCRIPTION

With reference to the figures, a sound protection panel 1 will now be described which is designed to clad a wall 12 of the automotive vehicle, said panel comprising, in particular to form a spring mass system:

a lower spring layer 2 made from resiliently compressible material, said layer being designed to be turned towards said wall 12, an upper mass layer 3 made from flakes 4 of resiliently compressible foam, said layer being provided with a bonding agent of said flakes which is made from bi-component fibres 5 comprising a core 6, said core being fusible at a high temperature or non-fusible, and a sheath 7 which is fusible at a lower temperature, said flakes being bonded by the fusion of said sheath so as to form an agglomerated upper layer 3.

Figure 1:
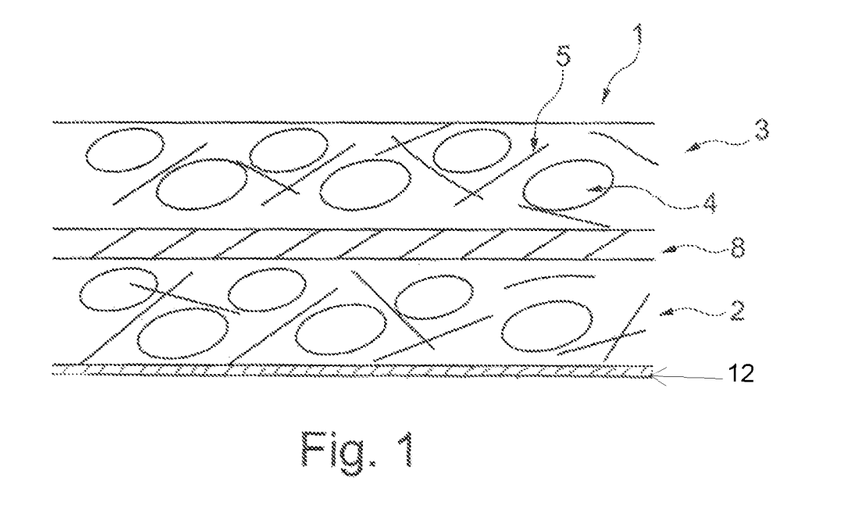
FIG. 1 is a partial cross-sectional schematic view of a panel according to a first embodiment, FIG. 2 a partial cross-sectional schematic view of a panel according to a second embodiment.

According to a first embodiment represented in a particular form in FIG. 1, the lower layer 2 is made from resiliently compressible foam flakes, said flakes being bonded together by a bonding agent made from bi-component fibres 5 so as to form an agglomerated lower layer 2.

Indeed, in a surprising manner, the applicant has observed that using a bonding agent made from bi-component fibres 5 makes it possible to achieve a very significant reduction of the density of the lower layer 2, relative to layers made of felt or resiliently compressible foam, and this while preserving its effectiveness as a spring in a "spring mass" type insulation system.

According to one embodiment, the lower layer 2 can have a variable thickness which can vary from 40 mm, in the non-compressed part, to 5 mm, in the heavily compressed part.

In particular, it is possible to compress the lower layer 2, for example at the periphery of the panel 1 or in function of space restrictions around the panel in the vehicle.

According to one embodiment associated with the first embodiment, the lower layer 2 has in the non-compressed part a density of less than 0.25, and in particular less than 0.20, such a low density can be achieved by using bi-component fibres 5, without damaging the properties of said layer as a spring.

According to a not shown embodiment, the lower layer 2 can be covered by a protective layer on at least one of its faces, said layer can be a 20 to 30 g/m² "spun" polyester or a non-woven fabric.

Such a protective layer can in particular facilitate the shaping of the lower layer 2, in particular during a preheating step, and also protect the layer during the manipulation of the panel 1.

According to an embodiment associated with the first embodiment, the lower layer 2 has a mass per unit area of less than 1000 g/m², and in particular less than or equal to 800 g/m², which is much less than the usually known masses per unit area for spring layers with a thickness of up to 40 mm.

According to one embodiment associated with the first embodiment, the fibres 5 take up between 10 and 20% by weight of the lower layer 2, and in particular between 13 and 17%, and in particular in the order of 15%.

According to one embodiment, the upper layer 3 being agglomerated, a sealing layer 8 is arranged between the upper layer and the lower layer 2.

Thus a spring mass system is provided which has absorption properties due to the porosity of the upper layer 3.

According to one embodiment, the sealing layer 8 is in the form of a thermoplastic film, in particular with a thickness of less than 200 microns.

According to a not shown embodiment, the upper layer 3 is arranged on the lower layer 2 without the interposition of a sealing layer, the upper layer having a greater resistance to the passage of air than the lower layer.

The corresponding panel 1 then provides sound protection which is no longer based on a spring mass principle which requires a sealing layer 8 to be interposed between the upper layer 3 and the lower layer 2.

The sound protection is then based on a principle of "bi-porosity" favouring acoustic absorption to the detriment of the insulation achieved when applying the principle of spring mass sound protection.

A method of forming such a panel 1 is now described, the method comprising the following steps:
  providing a resiliently compressible lower layer 2, the layer being made from a mixture of resiliently compressible foam flakes 4 mixed with bi-component fibres 5, the flakes being bonded together by the fusion of the sheath of the fibres forming a bonding agent,
  heating the lower layer and placing it in a mould so as to shape it to form the spring layer,
  connecting therewith an upper layer 3 forming the mass, which is joined or not to a sealing layer 8 arranged between the upper and lower layers.

Figure 2:
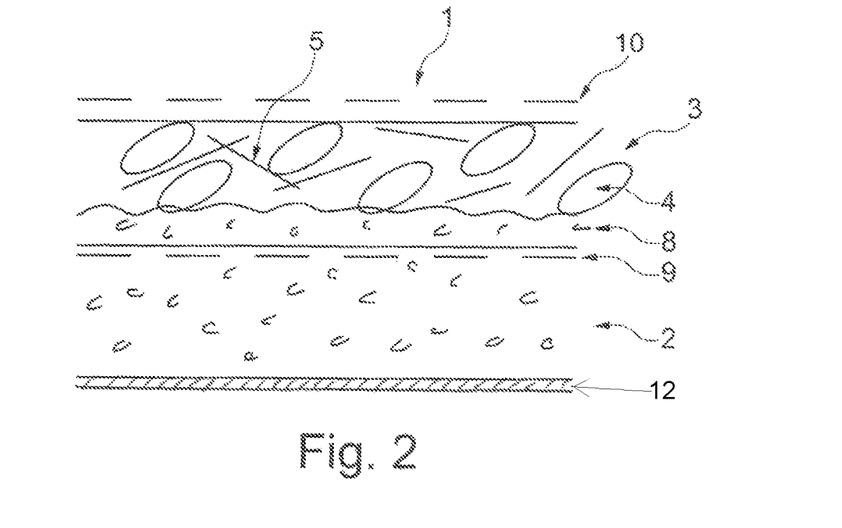

According to a second embodiment represented in a particular embodiment in FIG. 2, the lower layer 2 may not be agglomerated, a sealing layer 8 is arranged between the upper layer 3 and the lower layer.

According to a not shown embodiment associated with the second embodiment, the sealing layer 8 is in the form of a thermoplastic film, in particular having a thickness of less than 200 microns.

According to the embodiment shown in FIG. 2, the lower layer 2 is made of foam—in particular polyurethane—moulded onto the upper layer 3, the sealing layer 8 being formed by penetration of the foam in a portion of the thickness of the upper layer so as to form a sealing crust.

According to the embodiment represented, the upper layer 3 is coated, at least on its inner face, with a first non-woven fabric 9, the non-woven fabric having in particular a mass per unit area of between 40 and 80 g/m$^2$.

The first non-woven fabric 9 makes it possible in particular to limit the penetration of foam into the upper layer 3 so as to preserve its porous nature over a portion as large as possible of its thickness, in order to maintain its absorption properties.

In the shown embodiment, the upper layer 3 is also covered on its outer face with a second non-woven fabric 10, the non-woven fabric, having in particular a mass per unit area of between 40 and 60 g/m$^2$, which has in particular the function of avoiding the adhesion of the upper layer 3 to equipment for precompressing and/or thermoforming it.

According to a not shown embodiment associated with the second embodiment, the upper layer 3 is arranged on the lower layer 2, which can be agglomerated, without the interposition of a sealing layer, the upper layer having a resistance to the passage of air which is greater than that of the lower layer.

The corresponding panel 1 then provides sound protection which is no longer based on a spring mass principle which requires that the upper layer 3 is sealed or even that a sealing layer 8 should be interposed between the upper layer and the lower layer 2.

The sound protection is then based on a principle of "bi-porosity" favouring acoustic absorption to the detriment of the insulation achieved when applying a principle of spring mass sound protection.

Now, in this case of a sealing layer 8 resulting from a partial penetration of the upper layer 3 by the foam of the lower layer 2, a method for the formation of a panel 1 is described, the method comprising the following steps:
  discharging onto a support a mixture of foam flakes 4 and bi-component fibres 5, so as to form a non-bonded mat,
  covering the mat with a first non-woven fabric 9,
  performing a hot precompression of the assembly so as to form a prebonded sheet,
  thermoforming the sheet so as to form a three-dimensional upper layer 3,
  placing the layer in a mould and moulding over its face provided with the first non-woven fabric with a resiliently compressible foam so as to form a lower layer 2, the foam of which partially penetrates the upper layer creating a sealing layer 8,
  unmoulding the panel 1 obtained.

It is also possible to place on the mat a second non-woven fabric 10 on the face of the mat opposite to the face receiving the first non-woven fabric 9.

Figure 5:
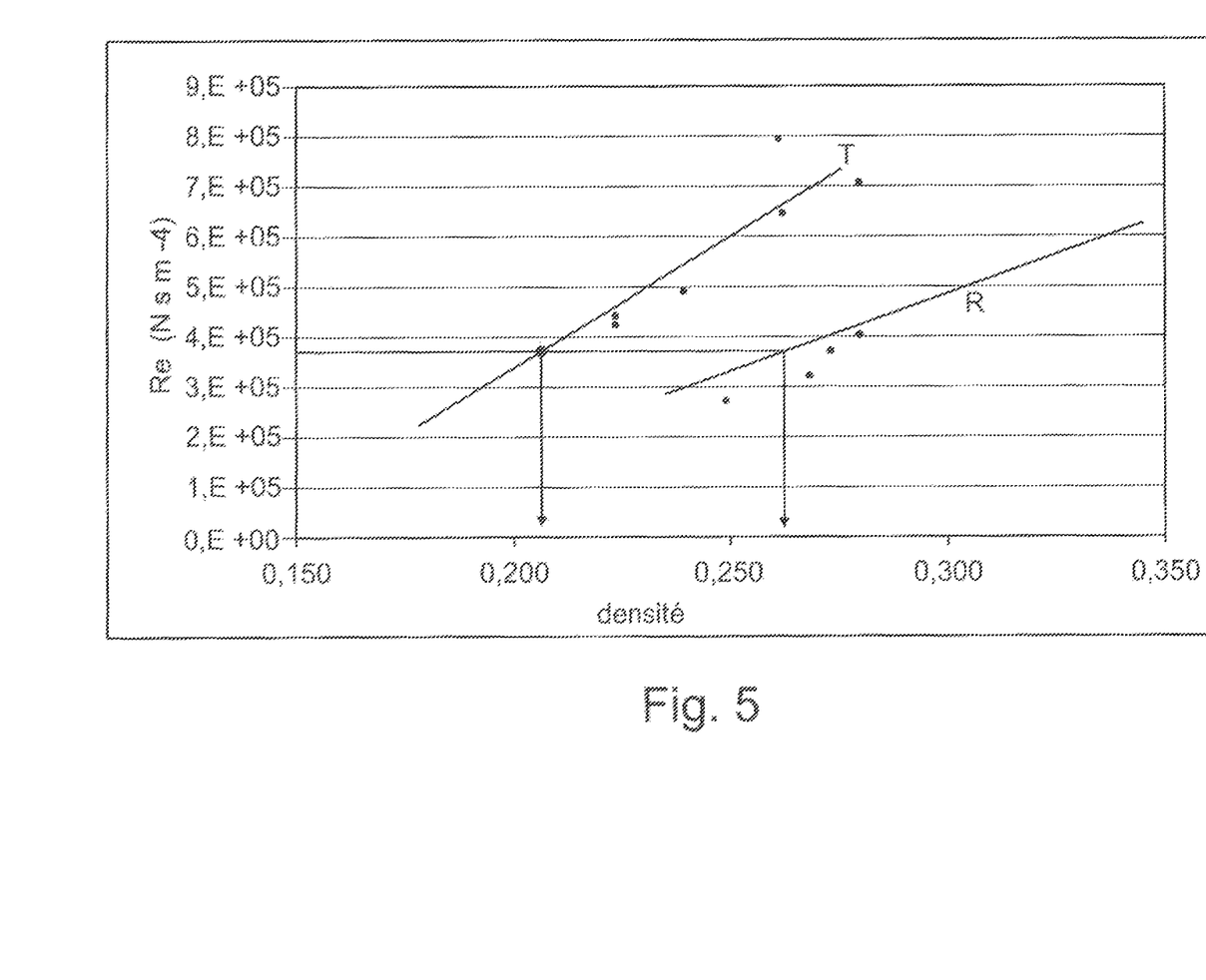
FIG. 5 shows the resistivity to the passage of air of two types of agglomerated layers made from resiliently compressible foam flakes, said types of layers differing from one another only in the bonding agent used, which is either in the form of resin (R) or in the form of bi-component fibres (T), said resistivity being measured on a plurality of samples of different densities.

As shown in FIG. 5, the replacement of a bonding agent in the form of resin by an agent in the form of bi-component fibres 5, all other parameters remaining unchanged, leads to a significant increase of the resistivity of the upper layer 3 to the passage of air, regardless of its density.

It should be noted here that it is the resistivity to the passage of air (N.s.m$^{-4}$) which is expressed, and not the resistance to the passage of air (N.s.m$^{-3}$), this for not taking into accountceci the thickness of the samples, knowing that one or the other can be used equally to compare two samples of the same thickness.

Figure 6:
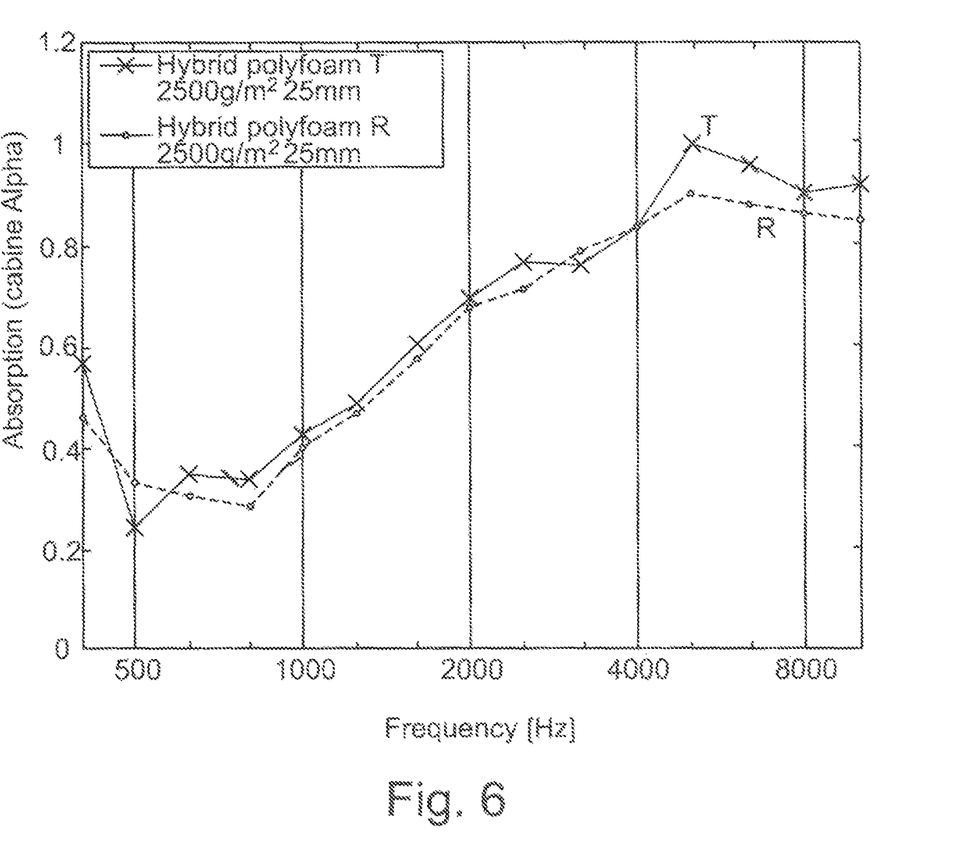
FIG. 6 shows the acoustic absorption in a diffuse field as a function of frequency, measured in an Alpha cabin, achieved by two samples each comprising a lower layer made of foam and an upper layer made of foam flakes bonded together by a bonding agent, said samples differing from one another only by the bonding agent used, which is either in the form of resin (R) or in the form of bi-component fibres (T).

Now with reference to FIG. 6, a comparison is made, in a frequency range, of the coefficient of absorption in a diffuse field, measured in an Alpha cabin, of two samples each having a lower layer 2 made of foam and an upper layer 3 made from foam flakes bonded together by a bonding agent.

The samples are similar and the only difference is the bonding agent used, which is in the form of resin for the first sample (R) and in the form of bi-component fibres as described above for the second sample (T).

The two samples each have a total thickness of 25 mm, the upper layer 3 having a thickness of 8 mm in each case.

For the two samples, the lower layer 2 moulds over the upper layer 3 so as to form a sealing layer 8 formed by the penetration of the foam in a portion of the thickness of the upper layer.

It is observed that over a frequency range extending from 800 to more than 8000 Hz the coefficient of absorption of the second sample (T) is generally greater than that of the first sample (R), more particularly at frequencies greater than 4000 Hz.

FIG. 6 thus illustrates the fact that the use of a bonding agent in the form of bi-component fibres, instead of an agent in the form of resin, results in an improvement of the absorption properties of the upper layer 3.

Such an improvement may be explained, as outlined above, by the fact that the bi-component fibres create webs embedded into the upper layer, the webs having the effect of increasing the resistivity, or resistance, to the passage of air, and therefore the properties of absorption.

Figure 3:
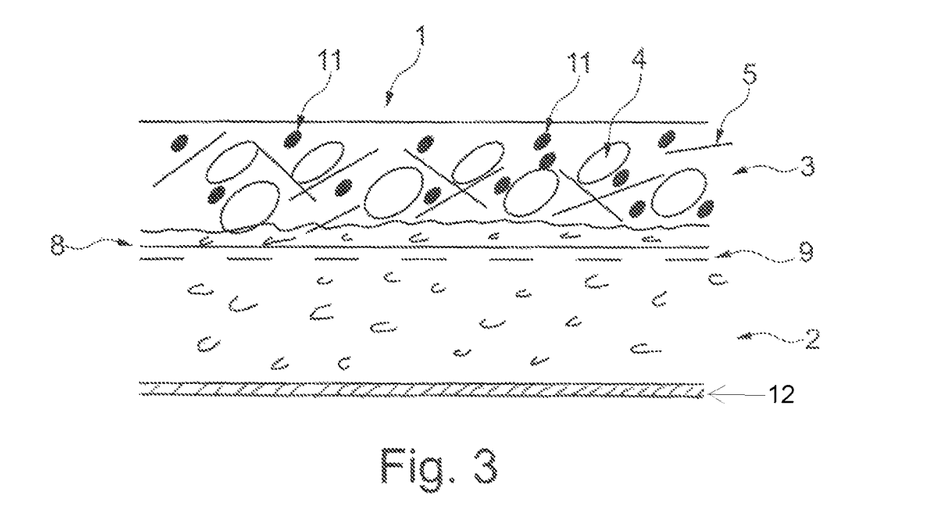
FIG. 3 is a partial cross-sectional schematic view of a panel according to a third embodiment.

According to a third embodiment, represented in a particular embodiment in FIG. 3, the upper layer 3 also comprises a dispersion of heavy particles 11 which has an intrinsic density greater than that of the flakes, the particles being bonded to the flakes 4 by the fusion of the sheath 7.

The heavy particles 11 can in particular be derived from crushing scraps from the production of car mats.

For this reason, they can in particular be made from a thermoplastic elastomer—in particular ethylene propylene diene monomer—charged with a mineral charge—for example barite or calcium carbonate—and can also contain dust from fibres derived from the aspect face of the mats.

The intrinsic density of the particles 11 can in particular be between 1 and 2.5.

The particles 11 can in particular have an intrinsic density of 20 to 60 times greater than that of the flakes 4.

The size of the heavy particles 11 can in particular be between 5 and 10 mm, in order to enable the optimal dispersion of the latter within the upper layer 3.

According to one embodiment related to the third embodiment, the percentage by mass of heavy particles 11 is between 20 and 40% of the mass of the upper layer 3.

According to one embodiment related to the third embodiment, the percentage by mass of the bi-component fibres 5 is between 15 and 30% of the mass of the upper layer 3.

According to an embodiment related to the third embodiment, the percentage by mass of flakes 4 is between 40 and 65% of the mass of the upper layer 3.

As shown in FIG. 3, a sealing layer 8 is arranged between the upper layer 3 and the lower layer 2.

According to a not shown embodiment related to the third embodiment, the sealing layer 8 is in the form of a thermoplastic film, in particular with a thickness of less than 200 microns.

According to a not shown embodiment related to the third embodiment, the lower layer 2 is agglomerated.

According to the embodiment represented in FIG. 3, the lower layer 2 is made from foam—in particular polyurethane—moulding over the upper layer 3, the sealing layer 8 being formed by the penetration of the foam into a portion of the thickness of the upper layer so as to form a sealing crust.

According to the shown embodiment, the upper layer 3 is covered, at least on its inner face, with a first non-woven fabric 9, the non-woven fabric having in particular a mass per unit area of between 40 and 80 g/m$^2$.

The first non-woven fabric 9 makes it possible in particular to limit the penetration of foam into the upper layer 3 so as to preserve its porous nature over the largest possible portion of its thickness, in order to maintain its absorption properties.

According to a not shown embodiment related to this third embodiment, the upper layer 3 is arranged on a lower porous layer 2 without the interposition of a sealing layer, the upper layer having a resistance to the passage of air that is greater than that of the lower layer.

The corresponding panel 1 then provides sound protection which is no longer based on a spring mass principle which requires either that the upper layer 3 is sealed or that a sealing layer 8 is interposed between the upper layer and the lower layer 2.

The sound protection is then based on a principle of "bi-porosity" favouring acoustic absorption to the detriment of the insulation achieved when applying a principle of spring mass sound protection.

In this case of a sealing layer 8 resulting from a partial penetration of the upper layer 3 by the foam of the lower layer 2, a method for the formation of a panel 1 is now described, the method comprising the following steps:
  discharging onto a support a mixture of foam flakes 4, bi-component fibres 5 and heavy particles 11, so as to form a non-bonded mat,
  covering the mat with a first non-woven fabric 9,
  performing a hot precompression of the assembly so as to form a prebonded sheet,
  thermoforming the sheet so as to form a three-dimensional upper layer 3,
  placing the layer into a mould and moulding over its face provided with the first non-woven fabric with elastically compressible foam so as to form a lower layer 2, the foam of which partially penetrates the upper layer creating a sealing layer 8,
  unmoulding the panel 1 obtained.

According to one embodiment related to all of the above embodiments, the flakes 4 are derived from recycling.

According to one embodiment related to all of the above embodiments, the flakes 4 are made from polyurethane.

According to one embodiment related to all of the above embodiments, the size of the flakes 4 is between 5 and 15 mm, to allow the optimal dispersion of the latter within the agglomerated layer.

Figure 4:
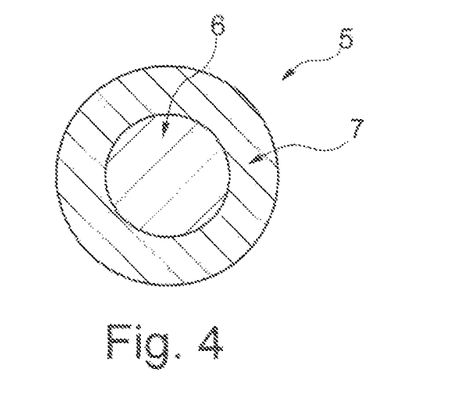
FIG. 4 is a cross-sectional schematic view of a bonding fibre.

According to one embodiment related to all of the above embodiments, the bi-component fibres 5 are made from polyethylene terephthalate (PET).

In particular, the core 6 can be made from polyester and the sheath 7 can be made from co-polyester.

According to one embodiment related to all of the embodiments described above, the fibres 5 can have a titer of between 1.7 and 6 dtex, and in particular in the order of 4.4 dtex, knowing that the use of fine fibres increases the resistance to the passage of air and therefore improves the absorption properties of the upper layer 3.

According to one embodiment related to all of the embodiments described above, which has already been explained for the second embodiment, the upper layer 3 can be covered on its external surface by a second non-woven fabric 10.

The second non-woven fabric 10 can in particular have a mass per unit area of between 40 and 60 g/m$^2$, the function of which is to avoid the adhesion of the upper layer 3 to equipment used for precompressing and/or thermoforming it.

According to one embodiment related to all of the embodiments described above, the second non-woven fabric 10 can have a resistance to the passage of air of between 200 and 1800 N.s.m$^{-1}$, so as to be resistant.

The use of such a resistant non-woven fabric 10 makes it possible to use an upper layer 3 with a minimised mass per unit area, for example in the order of 1000 g/m$^2$, the reduction of the resistance to the passage of air of the layer resulting from the reduction of its mass per unit area being compensated by the non-woven fabric which contributes to increasing the resistance of the assembly to the passage of air.

According to an embodiment related to all of the embodiments described above, the percentage by mass of bi-component fibres 5 in the upper layer 3 is between 15 and 30% of the mass of the layer, the additional mass being provided by the flakes 4 and possibly by the heavy particles 11, as explained above.

According to one embodiment related to all of the embodiments described above, the upper layer 3 has a Young's modulus greater than 1 MPa, measured in a direction corresponding to the thickness of the layer.

According to one embodiment related to all of the above embodiments, the upper layer 3 has a mass per unit area of between 0.7 and 5 kg/m$^2$.

What is claimed is:

1. A sound protection panel for cladding a wall of an automotive vehicle, the sound protection panel comprising a spring mass system:
   a lower spring layer made from resiliently compressible material, the lower spring layer being configured to be positioned towards the wall,
   an upper mass layer made from flakes of resiliently compressible foam, the flakes being bonded together by a bonding agent and the upper mass layer being configured to be positioned away from the wall on top of the lower spring layer,
   wherein the bonding agent is made from bi-component fibres comprising a core, the core being fusible at a temperature or non-fusible, and a sheath fusible at a temperature which, if the core is fusible, is lower than the temperature of fusion of the core, the flakes being bonded by the fusion of the sheath to form an agglomerated upper layer,
   the percentage by mass of the bicomponent fibres in the upper mass layer being between 15% and 30% of the mass of the upper mass layer; and
   the upper layer having a Young's modulus greater than 1 MPa, measured in a direction corresponding to the thickness of the upper layer, and having a mass per unit area of between 0.7 and 5 kg/m$^2$.

2. The panel according to claim 1, wherein the upper layer is arranged on the lower layer without the interposition of a sealing layer, the upper layer having a resistance to the passage of air which is greater than that of the lower layer.

3. The panel according to claim 1, wherein a sealing layer is arranged between the upper layer and the lower layer.

4. The panel according to claim 3, wherein the sealing layer is in the form of a thermoplastic film having a thickness of less than 200 microns.

5. The panel according to claim 3, wherein the lower layer is made from foam moulding over the upper layer, the sealing layer being formed by the penetration of the foam in a portion of the thickness of the upper layer to form a sealing crust.

6. The panel according to claim 1, wherein the lower layer is made from resiliently compressible foam flakes, the flakes being bonded together by a bonding agent made from bi-component fibres to form an agglomerated lower layer.

7. The panel according to claim 1, wherein the upper layer also comprises a dispersion of heavy particles with an intrinsic density greater than that of the flakes, the particles being bonded to the flakes by the fusion of the sheath.

8. The panel according to claim 7, wherein the percentage by mass of heavy particles is between 20 and 40% of the mass of the upper layer.

* * * * *